(12) United States Patent
Arkin

(10) Patent No.: US 10,142,373 B2
(45) Date of Patent: Nov. 27, 2018

(54) SECURITY-CONNECTED FRAMEWORK

(71) Applicant: McAfee, LLC, Santa Clara, CA (US)

(72) Inventor: Ofir Arkin, Petach Tikva (IL)

(73) Assignee: McAfee, LLC, Santa Clara, CA (US)

( * ) Notice: Subject to any disclaimer, the term of this patent is extended or adjusted under 35 U.S.C. 154(b) by 57 days.

(21) Appl. No.: 14/912,540

(22) PCT Filed: Sep. 28, 2014

(86) PCT No.: PCT/US2014/057934
§ 371 (c)(1),
(2) Date: Feb. 17, 2016

(87) PCT Pub. No.: WO2015/048598
PCT Pub. Date: Apr. 2, 2015

(65) Prior Publication Data
US 2016/0205142 A1    Jul. 14, 2016

Related U.S. Application Data

(60) Provisional application No. 61/884,006, filed on Sep. 28, 2013.

(51) Int. Cl.
*H04L 29/06*  (2006.01)
(52) U.S. Cl.
CPC ........ *H04L 63/205* (2013.01); *H04L 63/0263* (2013.01); *H04L 63/0281* (2013.01);
(Continued)
(58) Field of Classification Search
USPC .......................................................... 726/1
See application file for complete search history.

(56) References Cited

U.S. PATENT DOCUMENTS 5,987,610 A * 11/1999 Franczek .............. G06F 21/564
726/24
6,073,142 A *  6/2000 Geiger ................. G06Q 10/107
709/204

(Continued)

FOREIGN PATENT DOCUMENTS

| WO | 2008/122887 | 10/2008 |
| WO | 2015/048598 | 2/2015 |
| WO | 2015048599 A1 | 4/2015 |

OTHER PUBLICATIONS

International Search Report and Written Opinion in International Application PCT/US2014/057934 dated Dec. 17, 2014.

(Continued)

*Primary Examiner* — Taghi Arani
*Assistant Examiner* — Badri Champakesan
(74) *Attorney, Agent, or Firm* — Patent Capital Group

(57) ABSTRACT

In an example, a security-connected platform is provided on a data exchange layer (DXL), which provides messaging on a publish-subscribe model. The DXL provides a plurality of DXL endpoints connected via DXL brokers. In one case, DXL endpoints designated as producers are authorized to produce certain types of messages, including security-related messages such as object reputations. Other DXL endpoints are designated as consumers of those messages. A domain master may also be provided, and may be configured to provide physical and logical location services via an asset management engine.

19 Claims, 4 Drawing Sheets

(52) U.S. Cl.
CPC ...... *H04L 63/1408* (2013.01); *H04L 63/1425* (2013.01); *H04L 63/1441* (2013.01); *H04L 63/20* (2013.01)

(56) References Cited

U.S. PATENT DOCUMENTS

| | | | |
|---|---|---|---|
| 6,460,050 B1* | 10/2002 | Pace | G06Q 10/107 |
| 7,506,155 B1* | 3/2009 | Stewart | G06F 21/56 |
| | | | 713/150 |
| 7,792,989 B2* | 9/2010 | Toebes | H04L 67/1021 |
| | | | 709/223 |
| 7,814,226 B2* | 10/2010 | Patrick | H04L 41/145 |
| | | | 370/351 |
| 8,015,604 B1* | 9/2011 | Tidwell | H04L 41/046 |
| | | | 709/224 |
| 8,201,257 B1* | 6/2012 | Andres | G06F 21/568 |
| | | | 726/23 |
| 9,027,120 B1* | 5/2015 | Tidwell | G06F 21/606 |
| | | | 713/154 |
| 9,038,125 B2* | 5/2015 | Little | H04L 67/16 |
| | | | 726/1 |
| 9,811,849 B2* | 11/2017 | Bursey | H04W 4/70 |
| 2005/0201299 A1 | 9/2005 | Radi et al. | |
| 2008/0069124 A1 | 3/2008 | Patrick | |
| 2008/0140759 A1 | 6/2008 | Conner et al. | |
| 2008/0250097 A1* | 10/2008 | Angelini | G06F 9/5027 |
| | | | 709/202 |
| 2008/0288330 A1* | 11/2008 | Hildebrand | G06Q 10/06 |
| | | | 705/7.28 |
| 2009/0089078 A1* | 4/2009 | Bursey | H04W 4/70 |
| | | | 705/300 |
| 2010/0057835 A1 | 3/2010 | Little | |
| 2010/0080148 A1* | 4/2010 | Hulse | G06F 9/54 |
| | | | 370/257 |
| 2010/0088326 A1 | 4/2010 | Chen et al. | |
| 2010/0192216 A1* | 7/2010 | Komatsu | H04L 63/0209 |
| | | | 726/12 |
| 2010/0251327 A1* | 9/2010 | Channabasavaiah | H04L 63/20 |
| | | | 726/1 |
| 2011/0088099 A1 | 4/2011 | Villani et al. | |
| 2011/0125821 A1* | 5/2011 | Roshen | G06F 9/546 |
| | | | 709/201 |
| 2011/0154435 A1* | 6/2011 | Fot | H04L 63/102 |
| | | | 726/1 |
| 2011/0178942 A1* | 7/2011 | Watters | G06Q 10/06 |
| | | | 705/325 |
| 2011/0213844 A1* | 9/2011 | Pechanec | G06F 9/52 |
| | | | 709/206 |
| 2011/0225650 A1* | 9/2011 | Margolies | G06F 21/554 |
| | | | 726/22 |
| 2011/0288692 A1* | 11/2011 | Scott | G06F 21/55 |
| | | | 700/297 |
| 2012/0023576 A1* | 1/2012 | Sorensen | G06F 21/577 |
| | | | 726/22 |
| 2013/0055385 A1* | 2/2013 | Antony | G06F 21/552 |
| | | | 726/22 |
| 2013/0060825 A1* | 3/2013 | Farcasiu | G06F 17/30557 |
| | | | 707/812 |
| 2013/0074143 A1* | 3/2013 | Bu | H04L 63/1416 |
| | | | 726/1 |
| 2013/0205392 A1* | 8/2013 | Macwan | G06F 21/554 |
| | | | 726/23 |
| 2014/0007238 A1* | 1/2014 | Magee | G06F 21/577 |
| | | | 726/24 |
| 2014/0150060 A1* | 5/2014 | Riley | H04L 63/10 |
| | | | 726/3 |
| 2015/0207809 A1* | 7/2015 | Macaulay | G06F 21/552 |
| | | | 726/22 |
| 2016/0205143 A1* | 7/2016 | Bryson | H04L 63/205 |
| | | | 726/1 |
| 2016/0212228 A1* | 7/2016 | Arkin | H04L 67/18 |

OTHER PUBLICATIONS

International Preliminary Report on Patenatability in International Application No. PCT/US2014/057934 dated Mar. 29, 2016; 10 pages.
"Enabling Security Requirements for Enterprise Service-Oriented Architecture," Kalantari, Aleddin et al, Int. J. on Recent Trends in Engineering and Technology, vol. 6, No. 1, Nov. 21, 2011 (http://searchdl.org/public/journals/2011/IJRTET/6/1/243.pdf).
"Security Patterns within a Service-Oriented Architecture," Hinton, Heather, et al., Nov. 31, 2005 (http://cdn.ttgtmedia.com/searchSOA/downloads/SecuritySOA_(2).pdf).
International Search Report and Written Opinion in International Application PCT/US2012/057935 dated Jan. 12, 2015.
Non-Final Office Action issued in U.S. Appl. No. 14/913,101 dated Dec. 29, 2017, 14 pages.
USPTO Final Office Action issued in U.S. Appl. No. 14/913,101 dated Aug. 27, 2018, 18 pages.

* cited by examiner

SECURITY-CONNECTED FRAMEWORK

CROSS-REFERENCE TO RELATED APPLICATIONS

This Application is a national stage application under 35 U.S.C. § 371 of PCT Application PCT/US2014/057934, filed on Sep. 28, 2014 and entitled "Security-Connected Framework", which application claims the benefit of priority to U.S. Provisional Application 61/884,006, filed Sep. 28, 2013, titled "SECURITY-CONNECTED PLATFORM", Co-pending PCT Application PCT/US2013/076570, titled "Context-Aware Network on a Data Exchange Layer," filed Dec. 19, 2013, is also incorporated herein by reference. The disclosures of the prior applications are considered part of and are hereby incorporated by reference in their entirety in the disclosure of this application.

FIELD OF THE DISCLOSURE

This application relates to the field of enterprise security, and more particularly to a security-connected framework for a data exchange layer.

BACKGROUND

An enterprise service bus (ESB) is a software-based network architecture that provides a medium of data exchange over a service-oriented architecture. In some embodiments, ESB is a special case of a client-server software architecture in which clients may route messages through the server.

Software, binaries, executables, advertising, web pages, documents, macros, executable objects, and other data provided to users (collectively "executable objects") may include security flaws and privacy leaks that are subject to exploitation by malware. As used throughout this Specification, malicious software ("malware") may include a virus, Trojan, zombie, rootkit, backdoor, worm, spyware, adware, ransomware, dialer, payload, malicious browser helper object, cookie, logger, or similar application or part of an application designed to take a potentially-unwanted action, including by way of non-limiting example, data destruction, covert data collection, covert communication, browser hijacking, network proxy hijacking or redirection, covert tracking, data logging, keylogging, excessive or deliberate barriers to removal, contact harvesting, unwanted use of premium services, and unauthorized self-propagation. In some cases, malware may also include legitimate software that includes inadvertent security flaws that cause or enable malware behavior. "Malware behavior" is defined as any behavior that qualifies an application as malware or grayware. Some existing systems are configured to identify and block malware, for example by maintaining databases of known malware.

In addition to executable objects, computing devices may encounter static objects, which are not intended to change the operating state of a computer. As a class, executable objects and static objects may be referred to simply as "objects." An enterprise security concern is the classification of objects' malware status.

BRIEF DESCRIPTION OF THE DRAWINGS

The present disclosure is best understood from the following detailed description when read with the accompanying figures. It is emphasized that, in accordance with the standard practice in the industry, various features are not drawn to scale and are used for illustration purposes only. In fact, the dimensions of the various features may be arbitrarily increased or reduced for clarity of discussion.

DETAILED DESCRIPTION OF THE EMBODIMENTS

Overview

Figure 1:
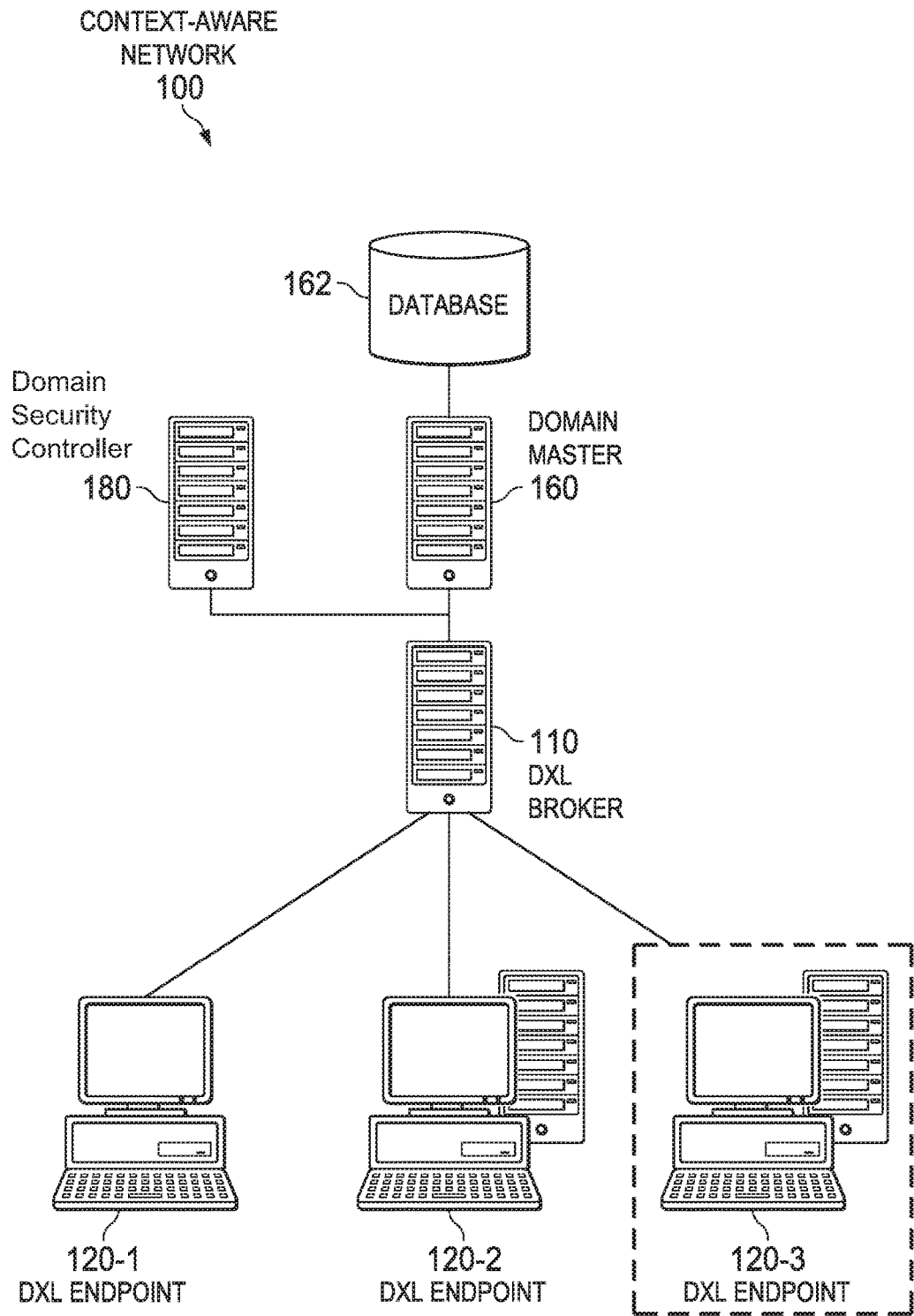
FIG. 1 is a block diagram of a context-aware network according to one or more examples of the present Specification.

In an example, a security-connected platform is provided on a data exchange layer (DXL), which may be provided on an enterprise service bus providing messaging services including publish-subscribe messaging, request-response messaging, push notification messaging and other messaging and communications capabilities. The DXL provides a plurality of DXL endpoints connected via DXL brokers. In one case, DXL endpoints designated as producers are authorized to produce certain types of messages, including security-related messages such as object reputations. Other DXL endpoints are designated as consumers of those messages. In another case a DXL endpoint may be designated as a producer producing certain types of messages and as a consumer of messages of the same type and/or other types produced by other producers available on the DXL. A domain master may also be provided, and may be configured to provide physical and logical location services via an asset management engine.

EXAMPLE EMBODIMENTS OF THE DISCLOSURE

The following disclosure provides many different embodiments, or examples, for implementing different features of the present disclosure. Specific examples of components and arrangements are described below to simplify the present disclosure. These are, of course, merely examples and are not intended to be limiting. Further, the present disclosure may repeat reference numerals and/or letters in the various examples. This repetition is for the purpose of simplicity and clarity and does not in itself dictate a relationship between the various embodiments and/or configurations discussed.

Different embodiments many have different advantages, and no particular advantage is necessarily required of any embodiment.

In an increasingly heterogeneous software ecosystem, enterprises may face new and enhanced security challenges and malware threats. This creates a situation in which real-time exchange of threat intelligence between otherwise autonomous network elements is desirable. Increased sharing may improve security between devices that otherwise operate in their own security "silos."

The system and method of the present Specification addresses such challenges by providing standardized data representations across data sources, and safeguarding the quality of data shared by disparate sources.

Context-Aware Computing (CAC) is a style of computing in which situational and environmental information about people, places and things is used to anticipate immediate needs and proactively offer enriched, situation-aware, and usable functions and experiences. Context-aware computing relies on capturing data about the world as it is at the moment the system is running.

According to one or more examples of the present Specification, a "context-aware network" is an adaptive system, including for example a security system, of interconnected services that communicate and share information to make real-time, accurate decisions by individual products and/or as a collective. According to an example, network, endpoint, database, application and other security solutions are no longer to operate as separate "silos" but as one synchronized, real-time, context-aware and adaptive, security system.

In an example, multiple network elements are connected to one another via a data exchange layer (DXL), which is a type of ESB that is suitable for exchange of security-related messages among other things. As used herein, "network elements" include any type of client or server (e.g., a video server, a web server, etc.), routers, switches, gateways, bridges, load-balancers, firewalls, inline service nodes, proxies, network appliances, processors, modules, or any other suitable device, component, element, or object operable to exchange information in a network environment. More specifically, DXL endpoints are network elements that interact over a DXL ESB. DXL endpoints may be distributed across a customer network and communicate in "real-time" in a trusted, secure, and reliable fashion. This may provide increased automation and improved security services.

In an example, DXL endpoints are deployed at strategic locations within a network to intercept ongoing business activity, inspect and interpret it, and ultimately determine whether it is authorized; meaning for example that it is consistent with enterprise security policies. In some cases, network elements must make such decisions "in-band," momentarily suspending the business activity, and in "machine-real-time," at latencies low enough to avoid a significant user-perceptible delay in the business activity.

In some cases, network elements may have independent access to security data only by way of their own independent analysis and observation, and via scheduled definition updates, which may come, for example, on a weekly basis as updated malware definition.

Because network elements are often heterogeneous and may be deployed, particularly in a modern network, in a temporary or ad hoc fashion, real-time intelligence becomes a challenge, particularly when "in-band" decisions are necessary. Furthermore, an enterprise may procure security solutions in a piecemeal fashion, so that one product cannot always assume the presence of another product. For example, there may not be a single, pre-defined repository of threat intelligence for network elements to consult, and regular malware definition updates may not include lately discovered threats. Representation and interpretation of data offer yet another challenge. Network elements may use disparate, proprietary data representations. Thus, for example, even an antivirus scanner may not be configured to share newly discovered malware information with a network-based security device. Trustworthiness of information may be yet another challenge in other contexts. In other words, even if an antivirus scanner and network-based security device are configured to share security intelligence, each may not have a means of validating intelligence received from the other.

In an example, the present Specification provides a data exchange layer (DXL), which may operate on a lightweight messaging-based communications infrastructure such as ESB and be configured to allow endpoints to share contextual data. DXL may be one element of a larger security-connected framework, which is an adaptive system, such as a security system, of interconnected services that communicate and share information to make real-time, accurate security decisions by individual security products and/or as a collective. According to an example, network, endpoint, database, application and other security solutions need not operate as separate 'silos' but as one synchronized, real-time, context-aware and adaptive security system.

The DXL is built on top of messaging technology, such as an ESB, which enables multiple different use cases and capabilities (context-aware and adaptive security by sharing context between multiple different products allowing for security components to operate as one to immediately share relevant data between endpoint, gateway, and other security products enabling security intelligence and adaptive security (immediately changing behavior according to information received in real-time); superior command and control of endpoints, and many other use cases).

These advantageous abilities are enabled by the use of ESB messaging for security and management purposes. DXL messaging enables real-time, bi-directional communications infrastructure, allowing products and solutions to integrate with each other using a single application programming interface (API). Each device may share essentially any data it likes over the DXL fabric, while the devices themselves are only loosely coupled, and need not operate on common or standardized protocols.

Examples of DXL message types include publish-subscribe notifications, query-response, and push notification. Devices may also share events, including security-related events, contextual information (about the node, the identity of its user, the applications used, the location for which they are found, etc.), commands, tasks, and policies, by way of non-limiting example.

In a first example of a security-connected framework, messaging technologies are used to maintain and enhance enterprise security. Security information shared over the security-connected framework may comprise more than just context, and may also comprise commands, tasks, policies and software updates by way of non-limiting example. Thus, with a security-connected framework, the infrastructure is able to function as a command and control management infrastructure. The infrastructure may also be used with security management software (SMS), such as McAfee® ePolicyOrchestrator. The SMS may connect to the DXL ESB, enabling the SMS to provide command and control functions across an entire network.

Messaging enables integration between products in a loosely coupled manner lowering the number of assumptions two or more products make about each other in order to integrate. The present implementation uses a single API embedded with the McAfee Agent and provided as a software library.

The security-connected framework of the present Specification also addresses issues of control over the status of operational security. Certain existing security management solutions are unable to initiate communications at-will with managed devices that sit, for example, on the other side of a network address translation (NAT) boundary. The challenge may become more complicated with changing business needs such as cloud, mobilization, and consumerization by way of non-limiting example.

In these cases, managed devices may initiate communication at unpredictable times, leaving open a window during which the enterprise is exposed to increased risk from its inability to immediately push policy changes, content deployments, and program updates to all nodes.

In one example of this challenge, orchestration of security defenses is needed as an immediate reaction to a security event. As used throughout this Specification, a "security event" includes any event on a device or a network that has substantial ramifications for personal and/or enterprise security. Non-limiting examples of security events include actual or potential intrusion events, user or device authentication events, audit events, malware incidents, anti-malware updates, user or device reputation updates, physical intrusion events, data loss, import of substantial or significant data, or changes in enterprise security policies.

In a second example of a security-connected framework, a real-time, bi-directional communications fabric is provided for enabling real-time security management. Specifically, certain existing messaging infrastructures are based on one-to-many communications (publish-subscribe). In this example of the present Specification, the publish-subscribe capabilities are significantly enhanced, so that communication can be one-to-one (for example, peer-to-peer), or bi-directional (for example, query-response). Advantageously, the framework can scale to millions of concurrent connected clients, so that any connected client can reach any other connected client in real-time or near real-time regardless of the physical location of the connected clients. To this end, the DXL abstraction layer is provided between different types of connected clients, and acts as an intermediary communications medium.

In this example, client devices may variously be classified as either "producers" or "consumers" of messages, wherein producers provide relevant security messages, and consumers receive those messages. A device's role as either a producer or consumer need not be static, and in general any device can be either a producer or a consumer, depending on context. A devices role as producer or consumer may also change over time or circumstances. Thus, one device may be both a producer and consumer of certain message topics; a second device may be a producer for some topics but not for other topics; a third device may be a consumer for certain topics and a producer for other topics.

As long as clients are subscribed to one or more topics (wherein each topic includes a different class or species of message) a communication path exists to the consumers. Connection initiation is performed by clients.

As used throughout this Specification, a "DXL message" includes any message communicated over a DXL ESB. Each DXL message includes at least one "topic," a topic representing a subject of the message. Topics may include threat intelligence, context, and events, by way of non-limiting example.

By design, each DXL endpoint is configured to subscribe to at least one DXL message topic (at a minimum, a private destination topic for routing DXL messages to that DXL endpoint). This enables bi-directional communications, over the DXL, between a management platform, for example, and one or more of its managed clients.

This configuration provides several advantages, including by way of non-limiting example:

a. Reduced time for distributing software (e.g. updates) from hours to near real-time.
   b. Automated real-time response to shared events.
   c. Push updates to policy, product and content in real-time.
   d. Significantly reduced bandwidth consumption because there is no need to connect and pull. Most messages are pushed.
   e. Informed decisions according to shared contextual data.
   f. A bi-directional, real-time, communication path between managed clients and a security management platform, system, or servers.

In a third example of a security-connected platform, push notification messaging may be used to increase efficiency and to decrease unnecessary network traffic. Certain existing push notification messaging systems send one notification per system, making it inefficient to send the same message to multiple different systems when they are not subscribed to the same message topic.

However, in the present example, when push notifications are sent, aggregation occurs on a per-location basis, and with a single push notification, the message is sent to a remote location. The message includes a marking, such as a header attribute, that determines which clients are to receive the notification. A local DXL broker then inspects the notification and splits the message into n notifications, which it delivers locally to all relevant targets. Thus, for example, where a DXL broker is connected to six client devices that all subscribe to their own private topics, only one copy of the message needs to go out over the network. The DXL broker then determines which six of its clients are to receive this message according to the header of the push notification, and delivers the message to those six clients. This significantly enhances the efficiency of sending push notifications of the same kind to a large number of clients when those clients are not subscribed to the same messages, subscribe to their own private topics, or subscribe to different topics. This is described in more detail in connection with FIG. 5.

In a fourth example, device location information may be used to automatically configure products and services on certain devices. This is described in more detail in connection with FIGS. 6-11.

In an example of a security-connected framework, a real-time, bi-directional communications fabric is provided for enabling real-time security management. Specifically, certain existing messaging infrastructures are based on one-to-many communications (publish-subscribe). The publish-subscribe capabilities may be significantly enhanced, so that communication can be one-to-one (for example, peer-to-peer), or bi-directional (for example, query-response). Advantageously, the framework can scale to millions of concurrent connected clients, so that any connected client can reach any other connected client in real-time or near real-time regardless of the physical location of the connected clients. To this end, the DXL abstraction layer is provided between different types of connected clients, and acts as an intermediary communications medium.

A DXL domain master may combine and reconcile the client properties received from a plurality of sources into a single record of truth according to a common information model (CIM), containing a single value or values. This may include determining that a first data source is more trusted than a second data source, and using the data from the first data source, or otherwise reconciling a plurality of data into a single record.

The reconciled data may be stored in a domain database, and a domain master may publish the client properties on the DXL. A DXL broker may then forward the published message to DXL endpoint, which received a singular and most accurate reconciled value. Subsequently, a client may send a DXL request over the DXL, inquiring about the properties of a DXL client. The DXL broker received this request and automatically routes it to a domain master. The domain master retrieves the client properties from its domain database and sends a DXL response message, which the DXL broker receives and forwards to the DXL client. Note that while the "publish-subscribe" transactions in this example are one-to-many, one-to-one "request-response" transactions are natively provided on the same fabric.

Further adding to extensibility, new or better data sources may be incorporated, by integrating them with domain master 160. This may be completely transparent to clients 120 and other DXL endpoints.

Additional features of a DXL broker may include, by way of non-limiting example: service and location registries to lookup registered endpoints, available services, and their locations; publish/subscribe (1:N), device-to-device (1:1), and push notification messaging interfaces; optimized message passing between brokers; destination-aware message routing; and broker-to-broker failover.

Advantageously, domain masters need not to be concerned with how each DXL endpoint treats a published message. Rather, that can be a matter of enterprise security policy.

Figure 2:
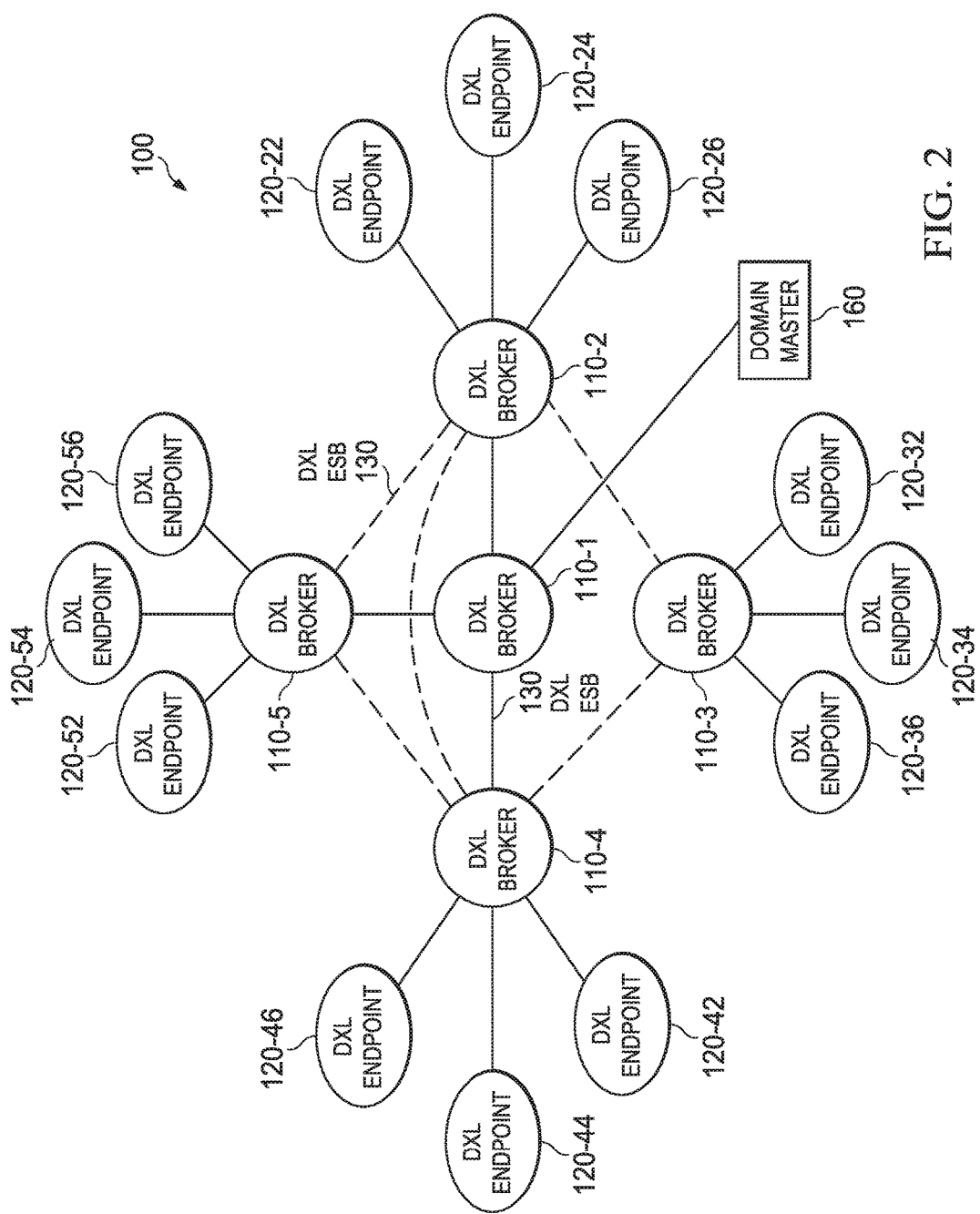
FIG. 2 is a block diagram of a data exchange layer according to one or more examples of the present Specification.

FIG. 1 is a network-level block diagram of a context-aware network 100 with DXL capability. According to this example, a plurality of DXL endpoints 120 is connected to a DXL enterprise service bus (ESB) 130 (FIG. 2). DXL ESB 130 is an example of a DXL fabric, and may be provided on top of an existing network, such as a local area network (LAN). DXL ESB 130 need not be a particular physical bus, or even reside on a physical network. Rather, DXL ESB 130 may span multiple physical networks and subnetworks. Conceptually, DXL ESB 130 is simply the "fabric" over which DXL endpoints 120 share DXL messages, wherein each DXL message includes a topic, and only DXL endpoints 120 that subscribe to that topic receive and/or act on messages for that topic. Advantageously, DXL ESB can extend even to non-trusted or unsecured networks so long as the DXL endpoints 120 themselves are trusted and can be sufficiently authenticated. Thus, for example, a remote user operating a DXL endpoint 120 at a coffee shop may still be able to send and receive DXL messages via his enterprise's DXL ESB 130, so long as the DXL endpoint 120 can be authenticated. In some cases, a DXL endpoint's network location may affect whether the DXL endpoint 120 is more trusted or less trusted for certain message topics.

DXL endpoint 120 may be any suitable computing device. In the example of FIG. 1, DXL endpoints are generically represented as computing devices. In one example, DXL endpoint 120-1 may be an embedded device, such as a network security sensor. DXL endpoint 120-2 may be a virtual machine. DXL endpoint 120-3 may be a laptop or notebook computer. It should also be noted that DXL endpoints are not limited to end-user or client devices. For example, domain master 160 and domain security controller (DSC) 180 may also have DXL client engines that enable them to function as DXL endpoints. Indeed, a major benefit of the DXL architecture is that servers and clients may exchange messages while being only loosely coupled, and remaining agnostic of each other's communication protocols and details.

DXL ESB 130 may be any type of physical or virtual network connection over which appropriate data may pass. At present, there is no fixed or global standard for an ESB, and the term, as used herein, is intended broadly to encompass any network technology or topology suitable for message exchange. In one embodiment, message queuing telemetry transport (MATT) messages are exchanged on port 8883. In this example, domain master 160 and DSC 180 may be considered special cases of DXL endpoints 120. Other network elements may include a joint threat intelligence (JTI) server, default gateway, proxy, and threat intelligence service. Any network element may join DXL ESB 130 as a DXL endpoint.

Network elements configured to operate on or with DXL ESB 130 may be referred to as "DXL endpoints." These may include, in an example, DXL endpoints 120, DXL broker 110, and domain master 160.

DXL broker 110 may be configured to provide DXL messaging services over DXL ESB 130, such as maintaining DXL routing tables and delivering messages.

Domain master 160 may be configured to communicatively couple to DXL broker 130. Domain master 160 may maintain domain data in a database such as database 162. In this example, domain master 160 and database 162 are shown as two distinct entities, but it should be noted that many configurations are possible. For example, database 162 may reside on a disk drive local to the domain master 160, or may be separately or remotely hosted. Database 162 is disclosed by way of example, and may be any suitable data store, including a structured or relational database, distributed database, or flat file by way of non-limiting example.

DSC 180 may be configured to provide domain services, such as auxiliary and support services, antivirus services, and/or command and control services. DSC 180 may include security management software (SMS), which may provide network command and control functions.

By way of operative example, a client such as laptop 120-3 connects to the LAN and receives a new IP address. At this point, several properties of laptop 120-3 become knowable to other network elements, including by way of non-limiting example, its IP address, information about its operating system, and the logged-on user's username. For ease of reference, these are referred to as "client properties" throughout this example. Client properties are embodiments of security-intelligence data, and are of interest to virtual machine 120-2, which has previously subscribed to the security-intelligence data topic with domain master 160.

Client properties may be reported to the DXL simultaneously by two distinct sources, namely by laptop 120-3, and by network security sensor 120-1. However, network security sensor 120-1 may fail to report a username value. It may also report an OS value different from that reported by the laptop 120-3. This may be, for example, because network security sensor 120-1 is sensing data remotely, and may not be able to determine these values as reliably as laptop 120-3 itself.

Domain master 160 is responsible for the "client system" data domain, which includes client properties. When laptop 120-3 and DXL endpoint 120-1 publish a message containing the client properties, both messages are first routed to DXL broker 110. DXL broker 110 may then forward the client properties to domain master 160.

Domain master 160 may combine and reconcile the client properties received from the two sources into a single record of truth, containing a single value for IP address, operating system, and username respectively. Specifically, it may determine via its own logic, and perhaps prior configuration, that laptop 120-3 is trusted more for OS value than network security sensor 120-1. Therefore, domain master 160 may ignore the "operating system" value received from network security sensor 120-1 when it conflicts with laptop 120-3.

The reconciled client properties are persistently stored in domain database 162. Domain master 160 may then publish the client properties on DXL ESB 130. DXL broker 110 may then forward the published message to virtual machine 120-2, which receives a singular and most accurate value for client properties. Note, however that this reconciliation process is optional. In some cases, domain master 160 may know that a particular DXL endpoint 120 is the "best" device for a particular message topic, and so will immediately consume a message from that DXL endpoint 120 without waiting for conflicting information.

Subsequently, DXL endpoint 120-4 may send a DXL request over DXL ESB 130, inquiring about the client properties for laptop 120-3. DXL broker 110 receives this request and automatically routes it to domain master 160. Domain master 160 retrieves the client properties from domain database 162 and sends a DXL response message, which DXL broker 110 receives and forwards to DXL endpoint 120-4. Note that while the "publish-subscribe" transactions in this example are one-to-many, the "request-response" transactions are one-to-one.

In some embodiments, DXL may be characterized by messaging that allows loose integration or coupling of multiple network elements. Loose coupling may reduce the assumptions each DXL endpoint must make about other DXL endpoints, such as the presence of certain capabilities, hardware, or software. According to one or more examples of the present Specification, DXL is a 'Plug-and-Play' API, and may facilitate context-aware and adaptive security by enabling context to be shared between products.

Further according to one or more examples of the present Specification, DXL is an elastic architecture with multiple deployment options and is highly scalable. DXL may also be designed with openness in mind and enable third-party integration.

DXL ESB 130 may be based on a two-layer protocol. The "bottom" layer is a secure, reliable, low-latency data transport fabric that connects diverse security elements as a mesh, or in a hub-and-spoke configuration. The "top" layer is an extensible data exchange framework that is configured to facilitate trustworthy data representation.

In an example, DXL endpoints connect to DXL ESB 130. Each DXL endpoint is assigned a distinct identity, and authenticates itself to DXL ESB 130 upon startup, for example via a certificate or other secure token. DXL endpoints may establish one-to-one communications via DXL ESB 130, for example by sending a DXL message addressed to a DXL endpoint with a specific identity. This enables DXL endpoints to communicate with each other without having to establish a point-to-point network connection. In an example, this is analogous to a person-to-person phone call.

In another example, DXL may provide a publish-subscribe framework in which certain DXL endpoints "subscribe" to messages of a certain type. When a DXL endpoint "publishes" a message of that type on DXL ESB 130, all subscribers may process the message, while non-subscribers may safely ignore it. In an example, this is analogous to a podcast subscription service. In yet another example, DXL may provide a request-response framework. In this case, one DXL endpoint may publish a request over DXL ESB 130. An appropriate DXL endpoint receiving the request may provide a response. Advantageously, the response may be used by more than just the DXL endpoint that originally published the request. For example, if a DXL endpoint 120 publishes a request for an object's reputation, a JTI server acting as a DXL endpoint 120 may respond by publishing the reputation. Thus, other DXL endpoints 120 that find instances of the object may benefit from the response. For example, DXL endpoints 120 may maintain a comprehensive cache of reputations published on the network. If a DXL endpoint 120 then newly encounters an object that is known on the network, DXL endpoint 120 already has an up-to-date reputation for the object.

DXL ESB 130 may be implemented using diverse software elements, patterns, and constructs suited to the specific infrastructure connecting the security elements. For instance, in a physical enterprise network, messaging middleware consisting of multiple interconnected message brokers may be deployed, where endpoints connect to the closest broker. In a virtual network infrastructure, the fabric may leverage hypervisor provided channels.

As noted above, DXL ESB 130 may be configured to provide real-time, trusted exchange of data among otherwise-autonomous, dynamically assembled DXL endpoints. Thus, in an example DXL ESB 130's conceptual framework may comprise two virtual components:

Broad collections of security-relevant data are categorized into "data domains." Each data domain is a closely related sub-collection of entities, attributes, and inter-relationships.

Domain master 160 is a data provider assigned ownership of data for each domain. Domain master 160 acts as an intermediate trusted data broker between first-hand sources of raw "intelligence" data, and data consumer endpoints such as DXL endpoints 120. Intelligence data may flow from data producer endpoints to the appropriate domain master 160, and then be relayed to data consumer endpoints such as DXL endpoints 120. Note that in this example, the concepts of "data producer" and "data consumer" are contextual roles, and not necessarily physical devices. A DXL endpoint 120 may be a data producer in one context and a data consumer in another context.

In an example, domain master 160 may establish first-hand trust relationships with data-provider endpoints. This enables it to gauge the quality (including accuracy and reliability) of data (such as reputation data) it receives from any particular source. When duplicate, piecemeal data is received from multiple (independent) sources, such as different DXL endpoints 120, domain master 160 may reconcile the data and resolve conflicts to derive a single best-known record of truth (such as, for example, a reputation) for each object. This ensures that DXL endpoints 120 receive consistent data.

Domain master 160 may also transform data into a well-understood, standardized representation. This representation may be published on DXL ESB 130, so that all DXL endpoints 120 receive usable data.

Advantageously, DXL endpoints do not need to know what device originated data, or make point-to-point connections to other DXL endpoints, even when one-to-one communication is necessary. Rather, DXL client software or DXL extensions enable a DXL endpoint to use its own local APIs for querying and receiving data. To increase network efficiency, DXL endpoints may cache received data locally, which data may be trusted until it is superseded by an authorized DXL message. For example, DXL endpoints 120 may subscribe to published reputations for objects. When an object reputation is received, either in response to a request-response transaction, or in a publish-subscribe model, DXL endpoint 120 may store the reputation in a local database.

The reputation may be trusted until superseded, because DXL master 160 is configured to publish a reputation update whenever it receives an updated reputation. Thus, frequent individual data requests from DXL endpoints 120 become bulk data subscriptions, as published reputations are available to all DXL endpoints 120 that subscribe to reputations. Advantageously, this may reduce the latency of data exchanges.

In yet another example, DXL broker 110 provides a discovery and location service that informs DXL endpoints of the specific domain master 160 to which data query and subscription requests should be routed.

Advantageously, the example DXL architecture described herein is flexible. For example, individual data sources may connect and disconnect from the network without affecting data consumers. Domain master 160 may simply rely on whatever data sources are available. Furthermore, the framework makes no assumptions about the physical location or specifically how domain master 160 or domain endpoints are deployed or configured. So long as each network element provides valid DXL messaging, traffic is routed correctly.

In the example above, DXL master 160 is a logical singleton, but it should be noted that DXL master 160 might be implemented, for example, as a set of distributed service components, where each component services either a subset of the domain, or provides a local data replica of a service running elsewhere. Such configurations may enhance scale, performance, and reliability. This may also allow services to be transparently relocated.

Further advantageously, the DXL framework provided herein is extensible. For example, data about new entities and relationships may be provided simply by creating new data domains. New attributes and relationships for existing data domains may be provided simply by defining new message types for that domain.

In an example, domain master 160 has responsibility over the domain of malware data. To distinguish messages from the "malware" domain, such as network status and device maintenance, a namespace may be defined for each. For example, the reputation domain may use the "MALWARE" namespace, the network status domain may use the "STATUS" namespace, and the device maintenance domain may use the "MAINT" namespace. Thus, if domain master 160 is the master for the reputation domain, it knows to process messages within the malware namespace, and to ignore all others. This allows a designer for each domain to assign a set of messages without having to consult existing domains to avoid name collisions for messages.

For example, both the reputation domain and a device maintenance domain may have use for a message such as DOWNLOAD_UPDATES. In the case of the reputation domain, this message may be an instruction to retrieve updated definitions from JTI server 150. In the device maintenance domain, this may be an instruction to download operating system updates from a vendor.

DXL endpoints 120 may be configured to exchange data from several DXL domains and may subscribe to messages on both the reputation domain and the device maintenance domain. Thus, DXL endpoint 120-1 for example, is able to parse and respond to a DXL message DOWNLOAD_UPDATES by requesting bulk reputation updates. In one embodiment, the message requesting malware updates may itself be a DXL message. In some cases, for example where the updates are large and are not needed in real-time, delivery of the updates may be completed outside of the DXL architecture to reserve a DXL for lightweight, high-speed messaging.

DXL endpoint 120 may also know that it should parse and respond to MAINT: DOWNLOAD_UPDATES by contacting a vendor's servers and requesting updates.

In the case where domain master 160 is configured as the master for the reputation domain, it may know to ignore all DXL messages that are not in the MALWARE namespace. Note, however that a single physical device may be configured to act as a domain master for multiple domains, in which case traffic in different namespaces may be passed to different subroutines. In some embodiments, DXL broker 110 may be configured to synthesize reports from a plurality of DXL network devices such as DXL endpoints 120 that are given lesser privileges, such as "suggest" privileges on DXL ESB 130.

Further adding to extensibility, new or better data sources may be incorporated, by integrating them with domain master 160. This may be completely transparent to DXL endpoints 120 and other DXL endpoints.

Additional features of a DXL broker 110 may include, by way of non-limiting example: service and location registries to look up registered endpoints, available services, and their locations; publish/subscribe (1:N), request/response (1:1), device-to-device (1:1), and push notification messaging interfaces; optimized message passing between brokers; destination-aware message routing; and broker-to-broker failover.

Advantageously, domain master 160 need not be concerned with how each DXL endpoint treats a published message. Rather, that can be a matter of enterprise security policy.

Additional DXL features for DXL endpoints 120 may include, by way of non-limiting example, local message bus integration and an API to discover brokers, authenticate to DXL, and send and receive catalogued messages.

Additional general features of context-aware network 100 may include, by way of non-limiting example: DXL broker and client provisioning and management of domain master 160; policy-based authorization of endpoints onto DXL ESB 130; secure SSL-based communications; proxy support for off-premises communications; and domain master appliances pre-configured with DXL broker functionality (thus joining domain master 160 and DXL broker 110 into one device).

FIG. 2 is a network diagram disclosing a DXL ESB 130 on a context aware network 100 according to one or more examples of the present Specification. In this example, DXL broker 110-1 may be designated as the "hub," while DXL brokers 110-2, 110-3, 110-4, and 110-5 may be designated as "spokes." in an example, all DXL traffic that passes through a spoke will be forwarded to the hub, which will distribute the traffic to other spokes. Designation of a DXL broker 110 as the hub may be accomplished via any suitable means, such as selecting the hub based on MAC ID, IP address, or network proximity to domain master 160.

If DXL broker 110-1 goes offline, another hub may be at least temporarily needed. In that case, another hub may be elected. When DXL broker 110-1 comes back online, it may resume its duties as a hub, or may act as a spoke, depending on network topology and design considerations.

In another example, spokes may form a temporary mesh network upon communicatively connecting to DXL broker 110-1. In yet other embodiments, DXL brokers 110 may be configured to operate full time in a mesh configuration.

Additional extensibility may be provided by bridging DXL ESB 130 across disparate networks, enabling data to be exchanged over larger networks, including the Internet.

DXL brokers 110 may be configured to enhance the efficiency of DXL ESB 130. For example, each DXL broker 110 may maintain a list of subscribed topics for each connected DXL endpoint 120. The DXL broker 110 then itself subscribes to those topics. Each DXL broker 110 also maintains a list of which topics each other DXL broker 110 subscribes to. When a DXL broker 110 receives a message from any of its DXL endpoints 120, the DXL broker 110 determines which other brokers are subscribed to the topic of the DXL message, and forwards the message only to those brokers.

For example, DXL endpoint 120-42 may be an antivirus definition update server. DXL endpoints 120-52, 120-54, 120-56, 120-34, 120-36, and 120-22 may be clients that have installed on them an antivirus engine that requires antivirus updates from antivirus definition update server 120-42. Thus, clients 120-52, 120-36, and 120-22 subscribe to a topic ANTIVIRUS_DEFN_UPDATES by notifying their respective DXL brokers 110 that they wish to subscribe to that topic. DXL brokers 110-5, 110-3, and 110-2 in their turn subscribe to the topic ANTIVIRUS_DEFN_UPDATES by publishing to the other DXL brokers 110 that they are now subscribed to that topic. When antivirus definitions update server 120-42 has new updates available, it may publish a message to the ANTIVIRUS_DEFN_UPDATES topic, indicating that new antivirus updates are available. The message may also include other information, such as instructions for downloading the updates, or an expiration date indicating that after a certain time, the message should be ignored as expired.

DXL broker 110-4 receives the message from antivirus definitions update server 120-42 and looks up in its own DXL routing table that DXL brokers 110 are subscribed to the topic ANTIVIRUS_DEFN_UPDATES. DXL brokers 110-2, 110-3, and 110-5 are subscribed to this topic, so DXL broker 110-4 sends a copy of the message to each of those brokers. It does not send a copy to DXL broker 110-1, which is not subscribed to the topic.

Next, DXL brokers 110-2, 110-3, and 110-5 each distribute the message to their respective DXL endpoints that have subscribed to the topic. Advantageously, network bandwidth is saved. For antivirus definitions update server 120-42 to notify each client individually, it would have had to send out six individual copies of the message (one to each subscribed client). But in this case, only three copies are sent over the DXL ESB 130 fabric, and the DXL brokers 110 then distribute the copies locally as necessary. This reduces the overall bandwidth requirement for DXL ESB 130.

Figure 3:
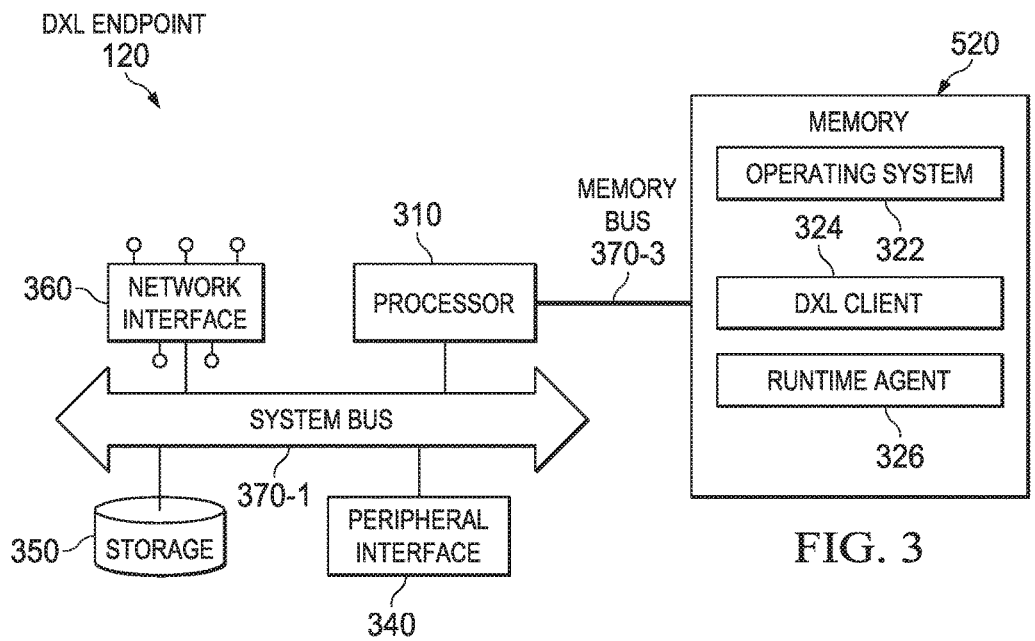
FIG. 3 is a block diagram of a data exchange layer (DXL) endpoint according to one or more examples of the present specification.

FIG. 3 is a block diagram of client device 120 according to one or more examples of the present Specification. Client device 120 may be any suitable computing device. In various embodiments, a "computing device" may be or comprise, by way of non-limiting example, a computer, embedded computer, embedded controller, embedded sensor, personal digital assistant (PDA), laptop computer, cellular telephone, IP telephone, smart phone, tablet computer, convertible tablet computer, handheld calculator, or any other electronic, microelectronic, or microelectromechanical device for processing and communicating data Client device 120 includes a processor 310 connected to a memory 320, having stored therein executable instructions for providing an operating system 322 and DXL client 324. Other components of client device 120 include a storage 350, network interface 360, and peripheral interface 340.

In an example, processor 310 is communicatively coupled to memory 320 via memory bus 370-3, which may be for example a direct memory access (DMA) bus by way of example, though other memory architectures are possible, including ones in which memory 320 communicates with processor 310 via system bus 370-1 or some other bus. Processor 310 may be communicatively coupled to other devices via a system bus 370-1. As used throughout this Specification, a "bus" includes any wired or wireless interconnection line, network, connection, bundle, single bus, multiple buses, crossbar network, single-stage network, multistage network or other conduction medium operable to carry data, signals, or power between parts of a computing device, or between computing devices. It should be noted that these uses are disclosed by way of non-limiting example only, and that some embodiments may omit one or more of the foregoing buses, while others may employ additional or different buses.

In various examples, a "processor" may include any combination of hardware, software, or firmware providing programmable logic, including by way of non-limiting example a microprocessor, digital signal processor, field-programmable gate array, programmable logic array, application-specific integrated circuit, or virtual machine processor.

Processor 310 may be connected to memory 320 in a DMA configuration via DMA bus 370-3. To simplify this disclosure, memory 320 is disclosed as a single logical block, but in a physical embodiment may include one or more blocks of any suitable volatile or non-volatile memory technology or technologies, including for example DDR RAM, SRAM, DRAM, cache, L1 or L2 memory, on-chip memory, registers, flash, ROM, optical media, virtual memory regions, magnetic or tape memory, or similar. In certain embodiments, memory 320 may comprise a relatively low-latency volatile main memory, while storage 350 may comprise a relatively higher-latency non-volatile memory. However, memory 320 and storage 350 need not be physically separate devices, and in some examples may represent simply a logical separation of function. It should also be noted that although DMA is disclosed by way of non-limiting example, DMA is not the only protocol consistent with this Specification, and that other memory architectures are available.

Storage 350 may be any species of memory 320, or may be a separate device, such as a hard drive, solid-state drive, external storage, redundant array of independent disks (RAID), network-attached storage, optical storage, tape drive, backup system, cloud storage, or any combination of the foregoing. Storage 350 may be, or may include therein, a database or databases or data stored in other configurations, and may include a stored copy of operational software such as operating system 322 and software portions of DXL client 324. Many other configurations are also possible, and are intended to be encompassed within the broad scope of this Specification.

Network interface 360 may be provided to communicatively couple client device 120 to a wired or wireless network. A "network," as used throughout this Specification, may include any communicative platform operable to exchange data or information within or between computing devices, including by way of non-limiting example, an ad-hoc local network, an Internet architecture providing computing devices with the ability to electronically interact, a plain old telephone system (POTS), which computing devices could use to perform transactions in which they may be assisted by human operators or in which they may manually key data into a telephone or other suitable electronic equipment, any packet data network (PDN) offering a communications interface or exchange between any two nodes in a system, or any local area network (LAN), metropolitan area network (MAN), wide area network (WAN), wireless local area network (WLAN), virtual private network (VPN), intranet, or any other appropriate architecture or system that facilitates communications in a network or telephonic environment.

Network interface 360 may be configured to communicatively couple client device 120 to a DXL broker 110.

A DXL client engine 324 may be provided, which may provide the necessary APIs and services for connecting to DXL ESB 130.

In some cases, a runtime agent 326 may also be provided, which may similarly be any suitable combination of hardware, software and/or firmware across one or more devices. Runtime agent 326 may be configured to provide additional or auxiliary services, such as anti-malware services, or may provide reporting functions for use with DXL ESB 130. In one example, runtime agent 326 may be similar to the McAfee® Agent (MA) software provided by McAfee, Inc.

DXL client engine 324 and runtime agent 326 are examples of "engines." As used throughout this Specification, an "engine" includes one or more logic elements, including hardware software, and/or firmware, configured to perform or operable for performing the function of the engine. An engine may be self-contained on a single device, or may span multiple devices. Furthermore, a single device may include a plurality of engines. For ease of discussion, the engines disclosed herein are shown, by way of example only, as a software subroutine running from memory. In one example, an engine is a utility or program that provides its host device with the necessary APIs and interfaces for performing a particular function. An engine may be, in other examples, embodied in hardware, software, firmware, or some combination thereof. For example, in some cases, an engine may include a special integrated circuit designed to carry out a method or a part thereof, and may also include software instructions operable to instruct a processor to perform the method. In some cases, the engine may run as a "daemon" process. A "daemon" may include any program or series of executable instructions, whether implemented in hardware, software, firmware, or any combination thereof, that runs as a background process, a terminate-and-stay-resident program, a service, system extension, control panel, bootup procedure, BIOS subroutine, or any similar program that operates without direct user interaction. In other examples, an engine may include other hardware and software, including interactive or user-mode software, which may be provided in conjunction with, in addition to, or instead of the engine to perform methods according to this Specification.

In one example, an engine comprises executable instructions stored on a non-transitory computer-readable medium operable, when executed, for performing the methods of the engine. At an appropriate time, such as upon booting the host device, or upon a command from an operating system or a user, the processor may retrieve from storage a copy of the engine and load it into memory. The processor may then iteratively execute the instructions of the engine.

Peripheral interface 340 may be configured to interface with any auxiliary device that connects to client device 120 but that is not necessarily a part of the core architecture of client device 120. A peripheral may be operable to provide extended functionality to client device 120, and may or may not be wholly dependent on client device 120. In some cases, a peripheral may be a computing device in its own right. Peripherals may include input and output devices such as displays, terminals, printers, keyboards, mice, modems, network controllers, sensors, transducers, actuators, controllers, data acquisition buses, cameras, microphones, speakers, or external storage by way of non-limiting example.

Figure 4:
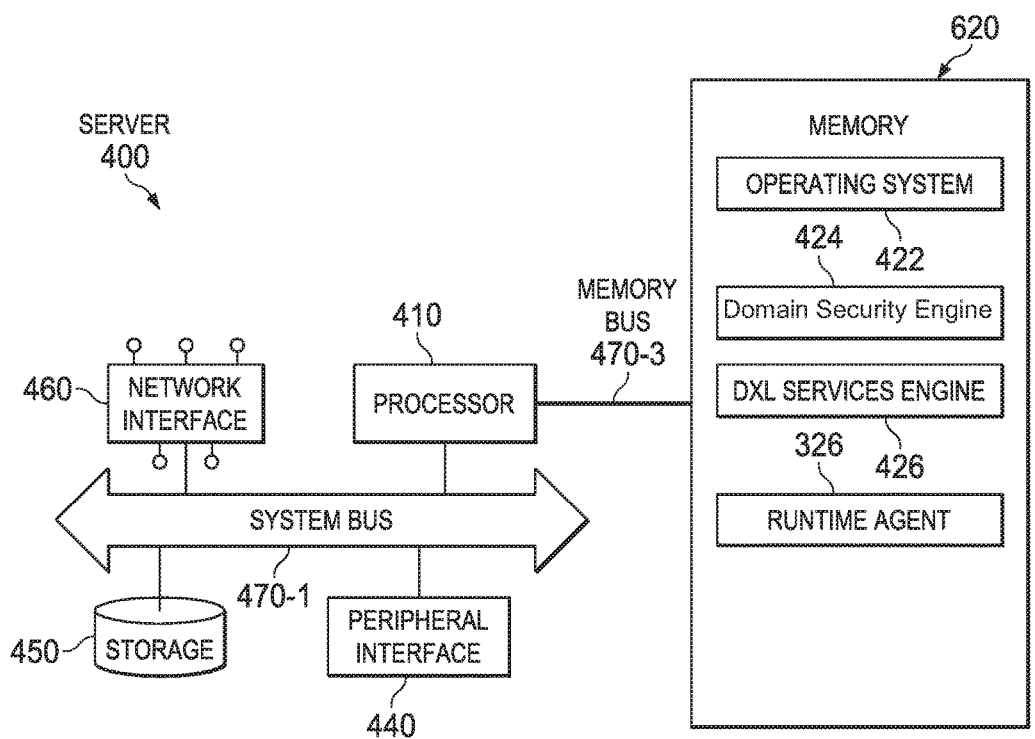
FIG. 4 is a block diagram of a server according to one or more examples of the present Specification.

FIG. 4 is a block diagram of a server 400 according to one or more examples of the present Specification. Server 400 may be any suitable computing device, as described in connection with FIG. 3. In general, the definitions and examples of FIG. 3 may be considered as equally applicable to FIG. 3, unless specifically stated otherwise. However, a server 400 may usefully and conceptually be used to refer to a class of computing devices that provide server functions in client-server architectures. Thus, in certain embodiments, domain masters 160, DSC 180, DXL broker 110, and other devices described herein may all be various embodiments of servers 400. They are discussed here together for purposes of clarity, and because servers 400 may share many common elements.

DXL broker 110 includes a processor 410 connected to a memory 420, having stored therein executable instructions for providing an operating system 422 and DXL broker engine 424. Other components of DXL broker 110 include a storage 450, network interface 460, and peripheral interface 440.

In an example, processor 410 is communicatively coupled to memory 420 via memory bus 470-3, which may be for example a direct memory access (DMA) bus. Processor 410 may be communicatively coupled to other devices via a system bus 470-1.

Processor 410 may be connected to memory 420 in a DMA configuration via DMA bus 470-3. To simplify this disclosure, memory 420 is disclosed as a single logical block, but in a physical embodiment may include one or more blocks of any suitable volatile or non-volatile memory technology or technologies, as described in connection with memory 320 of FIG. 3. In certain embodiments, memory 420 may comprise a relatively low-latency volatile main memory, while storage 450 may comprise a relatively higher-latency non-volatile memory. However, memory 420 and storage 450 need not be physically separate devices, as further described in connection with FIG. 3

Storage 450 may be any species of memory 420, or may be a separate device, as described in connection with storage 350 of FIG. 3. Storage 450 may be, or may include therein, a database or databases or data stored in other configurations, and may include a stored copy of operational software such as operating system 422 and software portions of DXL broker engine 424. Many other configurations are also possible, and are intended to be encompassed within the broad scope of this Specification.

Network interface 460 may be provided to communicatively couple DXL broker 110 to a wired or wireless network. In one example, network interface 460 provides a plurality of logical interfaces, which may include a plurality of logical interfaces on a single physical network interface, or a plurality of logical interfaces on a plurality of physical network interfaces, a single logical network interface on a plurality of physical network interfaces, or any combination thereof. In one example, a first logical network interface is configured to communicatively couple DXL broker 110 to DXL ESB 130, including to other DXL brokers 110 on DXL ESB 130. A second logical interface may be configured to communicatively couple DXL broker 110 to a plurality of DXL endpoint devices such as DXL clients 110.

Memory 620 may include, all or part of domain security engine 424, DXL services engine 426, and/or a runtime agent 326. Each may be an engine, as described in connection with FIG. 3.

Domain security engine 424 may be operable for providing the security methods described in this Specification. In one example, domain security engine 424 is operable to subscribe to a security DXL topic, and to receive security-related DXL messages. Domain security engine 424 may act on those messages according to methods described herein. Domain security engine 424 may also be configured to act as a security information and event manager (SIEM) apparatus. In the SIEM role, domain security engine 424 may provide services such as comparing data collected by a variety of security devices, applications and data sources, including one or more DXL endpoints 120. A SIEM may pool routers, switches, and virtual machines (VMs) and then normalize the data. Data may thus be standardized and synthesized. A SIEM may also categorize data, detecting for example a "login" event regardless of the host operating system.

Domain security engine 424 may also be configured to detect and act on or mitigate security events. A "security event" includes any event on a network that indicates a breach or intended breach of a security policy, represents a security threat, provides a security aperture, or indicates a change in security policy.

DXL services engine 426 may be provided to provide the necessary APIs and services to enable a server 400 to act as a DXL endpoint, including in particular to act as a provider of relevant DXL message topics.

Peripheral interface 440 may be configured to interface with any auxiliary device that connects to DXL broker 110 but that is not necessarily a part of the core architecture of DXL broker 110. A peripheral may be operable to provide extended functionality to DXL broker 110, and may or may not be wholly dependent on DXL broker 110. In some cases, a peripheral may be a computing device in its own right. Peripherals may include, by way of non-limiting examples, any of the devices discussed in connection with peripheral interface 340 of FIG. 3.

Figure 5:
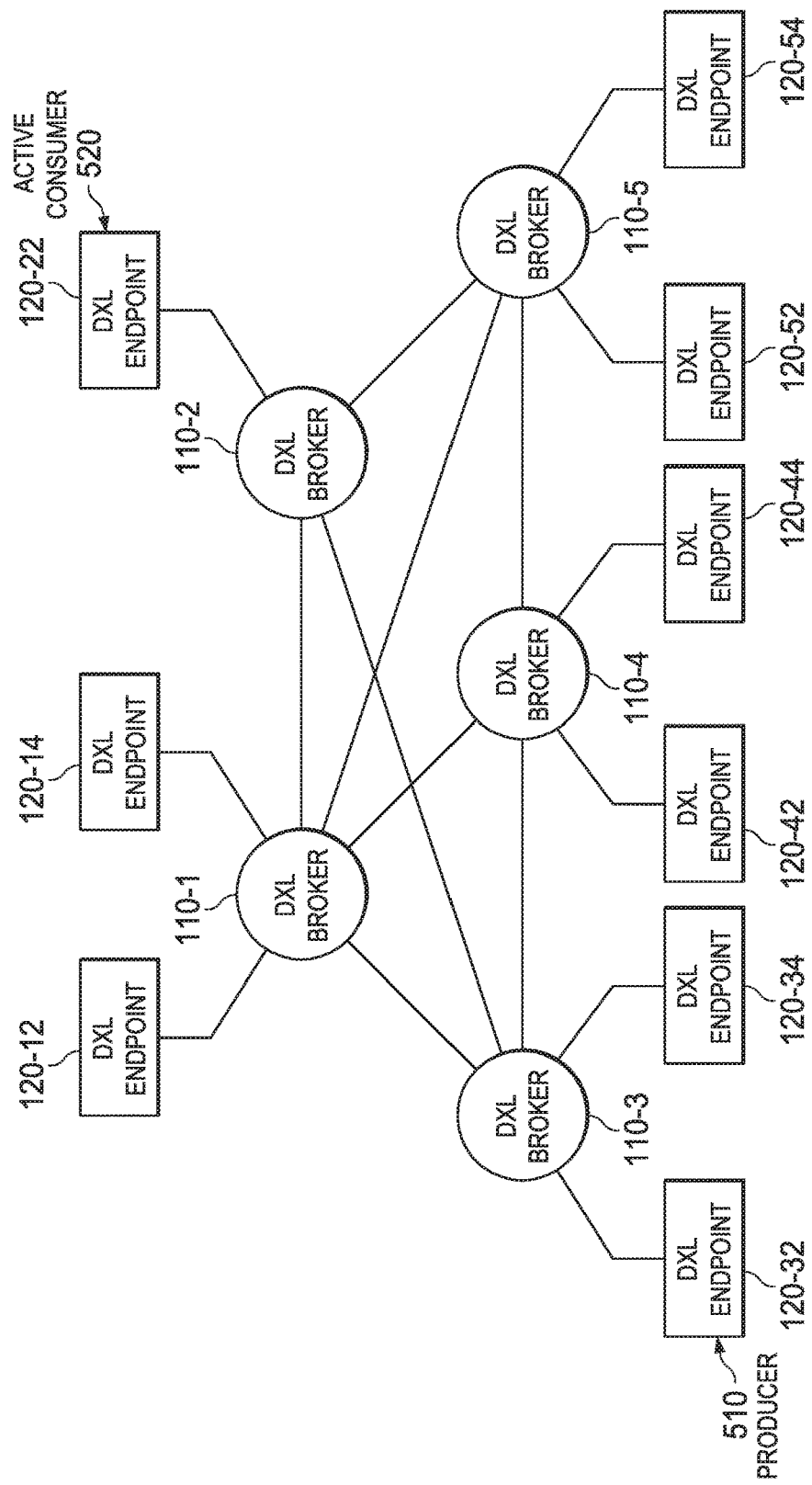
FIG. 5 is a block diagram of a producer-consumer architecture according to one or more examples of the present Specification.

FIG. 5 is a network-level block diagram of a data exchange layer according to one or more examples of the present Specification. In the example of FIG. 5, five DXL brokers 110 provide services to DXL endpoints 120.

Specifically, DXL endpoints 120-12 and 120-14 are connected to DXL broker 110-1. DXL endpoints 120-32 and 120-34 are connected to DXL broker 110-3. DXL endpoints 120-42 and 120-44 are connected to DXL broker 110-4. DXL endpoints 120-52 and 120-54 are connected to DXL broker 110-5. DXL endpoint 120-22 is connected to DXL broker 110-2.

The configuration of FIG. 5 is particularly adapted to a consumer/producer model of a data exchange layer. In this model, certain devices are designated as producers of content, while other devices are designated as consumers of that content. For example, in one case DXL endpoint 120-32 may be designated as producer 510. DXL endpoint 120-22 may be designated as active consumer 520.

In this example, producer 510 may be a security appliance or other network device that is trusted to produce a certain type of data. This may include, for example, assigning a reputation to a network object on DXL ESB 130. When producer 510 encounters the object, it may store the reputation of the object in an internal database.

Later, when active consumer 520 encounters the object, it may desire to know the reputation of the object. Thus, active consumer 520 may publish a DXL message such as OBJECT_REPUTATION_QUERY on DXL ESB server 130.

Producer 510 may subscribe to this message, and upon receiving the message, look up the reputation of the object in its internal database. Producer 510 then publishes a message REPUTATION_QUERY_RESPONSE on DXL ESB 130. Active consumer 520 consumes this message, and may react to the network object appropriately according to the content of the message.

In one example, an important property of producer 510 is that it is trusted. This may mean, for example, that producer 510 has been verified to a certain confidence level. Because producer 510 is verified, it can be trusted to produce reliable data for consumption by other DXL endpoints. Thus, while some instances of DXL ESB 130 may permit any endpoint to act as either a producer or consumer of certain types of messages, in other embodiments, only certain endpoints may act as producers of certain kinds of messages. In those embodiments, designation of certain endpoints as consumers 520 may be more permissive.

The producer-consumer framework described in FIG. 5 can advantageously be used to realize network security operations. Several are described herein by way of non-limiting example. It should be noted that in each of these examples, one or more appropriate DXL message topics might be provisioned to carry appropriate messages.

In a first example, a first DXL endpoint 120-1 publishes a message with information about the endpoint itself (context) for a second DXL endpoint 120-2 to adapt to the context and reconfigure its own security. A good example is that a client (DXL endpoint 120-1) publishes the identity of its user and the authorization groups it belongs to, along with its own IP address for a firewall (DXL endpoint 120-2) to assign the correct firewall policy to the client. Whenever there is a change, such as a different user logs in or the client's IP address changes, the information is republished, and the configuration is re-adjusted on the firewall.

In a second example, information gathered from DXL messaging may be used to build context-sensitive policies, where context may include factors such as location, identity, users, and applications. Example use cases include:
  a. Assign a matching security policy to a device (DXL endpoint 120) in an abstract manner, regardless of where the device is located or which firewall its network traffic passes through. As an example, the same policy may always be assigned to the device regardless of its location.
  b. Determine a DXL endpoint 120 device type (such as web server or client) and report available running network services to automatically attach an appropriate intrusion prevention system (IPS) policy for the device and for the network service, or attach a policy according to an IPS group.
  c. Configure a DXL endpoint 120 device with a security policy according to its location. The location may include a level of hostility, which may be assigned, for example, as a network reputation.
  d. Assign a context-sensitive policy in response to a possible infection of a DXL client 120. Surrounding devices may harden their firewall policies to block any connection attempts coming from DXL client 120. Network gateways and next-generation firewalls (NGFW) may prevent outside hosts from connecting to the network.
  e. Signal the criticality of an asset so that it can be better protected, for example by stricter IPS policies. For example:
    i. Data loss prevention (DLP) signaling the sensitivity level of documents found on the device for other controls to tighten security accordingly. NGFW and IPS better safeguard the device, and on-device policies are hardened.

ii. Signaling the criticality of the device according to who is using the device (NGFW and IPS better safeguarding the device, the on-device policies are hardened)

In a third example, DXL information is used to immunize the rest of the "estate" (gateways and hosts alike) when a threat is detected.

In a fourth example, the knowledge gained with a block (e.g. hash) may be shared among all security controls.

In a fifth example, a network gateway may block an attempted attack and share knowledge and "smoke signals" about the characteristics of the attack over DXL ESB 130. Other network gateways, clients, and other security components that are connected to DXL ESB 130 may then immediately begin to immunize themselves against the threat.

For example, an NGFW detects and blocks an evasion attack coming from a certain IP address. The NGFW then shares the IP address from which the attack had been initiated over the DXL, in real-time, for any other gateway, endpoint and other security component that is connected to the DXL to immediately disallow any communications, to or from, the attacking IP address (immunization). In this case an attack, which had been blocked by a certain security control in real-time, is generating a smoke signal, which is now being shared in real-time, and used to prevent any communications with the source IP address. The smoke signal (the IP address of the attacking side) may be used by a security information and event management (SIEM) server (such as DSC 180) to immediately search the logs and events it has and is collecting for suspicious activities which may involve the now-malicious IP address (yielding possible additional smoke signals to further examine).

In a sixth example, DXL may be used for application sandboxing. Application sandboxing is a security mechanism often used to execute unverified code/untrusted programs using a multitude of methods directed toward classifying whether code has malicious intent by analyzing the actual behavior of the code when executed. In one example, DSC 180 may provide application sandboxing while connected to DXL ESB 130. After analyzing unverified code and determining that it is malicious, DSC 180 may publish its findings via DXL ESB 130. Network gateways, endpoints and other security solutions that are connected to DXL ESB 130 are to use the analysis provided by the application sandboxing solution (among those, malicious provider edges, IPs, uniform resource locators (URLs) and other artifacts) to immediately prevent execution and communications to and from these IPs and URLs as well as determine whether they have previously executed malicious code.

In a seventh example, an intrusion prevention system, which may be embodied for example in DSC 180, identifies malicious command and control traffic coming from an endpoint within the network targeting an outside destination IP address. The intrusion prevention system is to send a push notification to the suspected infected endpoint via DXL ESB 130 letting the security software stack on the host know the host is compromised. The security software stack can in turn apply strict security policies isolating the host from the rest of the network and preventing data exfiltration or other harm to the network.

DSC 180 then sends a DXL message to all DXL endpoints on the same network that the suspected infected endpoint is part of, indicating that the endpoint is probably compromised. Devices may then harden their security configuration blocking any communications going to and coming from the suspected infected device. Network gateways (firewall, intrusion prevention, mail, web) that are connected to DXL ESB 130 are to react by configuring a security policy preventing the infected host from communicating outside of the network.

In an eighth example, having network gateways, endpoints and other security components be part of the DXL opens opportunities for additional use cases. One such use case is connecting a Security Information and Event Management (SIEM) solution to the DXL for receiving events and logs in real-time from components connected to the DXL. Transforming a SIEM receiving events and logs in real-time provides the following value propositions:

a. The SIEM now operates in real-time from log/event collection to effectuation (receive events and logs in real-time, process and analyze events in real-time).

b. The traditional operation of a SIEM is now transformed from a librarian to a hunter. Automates real-time response from providing actionable intelligence to orchestrating active prevention in real-time c. Critical events are promoted immediately to the attention of the analysts significantly reducing the amount of time needed to respond to security events d. Operational costs are significantly reduced as the number of analysts and time associated with analyzing data is reduced.

One example is a SIEM receiving events and logs coming from a host data loss prevention solution. The events and logs, received in real-time over the DXL, are to be processed and analyzed in real-time by the SIEM looking for behavioral abnormalities with the way a user is handling sensitive content. As soon as such a behavioral abnormality is detected, the SIEM may immediately act on the information by (for example)

a. Sending a push notification message to the host DLP solution used on the host, and that is connected to the DXL, to immediately 'close all hatches' on the host preventing data from being exfiltrated; and b. Sending a broad DXL message announcing the device is to be quarantined, allowing network gateways part of the DXL to disallow communications coming to and originating from this device.

In this use case, a procedure which previously took hours or more, may now be executed in real-time (logs and events are collected in real-time, processing and analysis is done in real-time, effectuation is done in real-time).

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

The particular embodiments of the present disclosure may readily include a system on chip (SOC) central processing unit (CPU) package. An SOC represents an integrated circuit (IC) that integrates components of a computer or other electronic system into a single chip. It may contain digital, analog, mixed-signal, and radio frequency functions: all of which may be provided on a single chip substrate. Other embodiments may include a multi-chip-module (MCM), with a plurality of chips located within a single electronic package and configured to interact closely with each other through the electronic package. In various other embodiments, the digital signal processing functionalities may be implemented in one or more silicon cores in application specific integrated circuits (ASICs), field programmable gate arrays (FPGAs), and other semiconductor chips.

In example implementations, at least some portions of the processing activities outlined herein may also be implemented in software. In some embodiments, one or more of these features may be implemented in hardware provided external to the elements of the disclosed figures, or consolidated in any appropriate manner to achieve the intended functionality. The various components may include software (or reciprocating software) that can coordinate in order to achieve the operations as outlined herein. In still other embodiments, these elements may include any suitable algorithms, hardware, software, components, modules, interfaces, or objects that facilitate the operations thereof.

Additionally, some of the components associated with described microprocessors may be removed, or otherwise consolidated. In a general sense, the arrangements depicted in the figures may be more logical in their representations, whereas a physical architecture may include various permutations, combinations, and/or hybrids of these elements. It is imperative to note that countless possible design configurations can be used to achieve the operational objectives outlined herein. Accordingly, the associated infrastructure has a myriad of substitute arrangements, design choices, device possibilities, hardware configurations, software implementations, equipment options, etc.

Any suitably configured processor component can execute any type of instructions associated with the data to achieve the operations detailed herein. Any processor disclosed herein could transform an element or an article (for example, data) from one state or thing to another state or thing. In another example, some activities outlined herein may be implemented with fixed logic or programmable logic (for example, software and/or computer instructions executed by a processor) and the elements identified herein could be some type of a programmable processor, programmable digital logic (for example, a field programmable gate array (FPGA), an erasable programmable read only memory (EPROM), an electrically erasable programmable read only memory (EEPROM)), an ASIC that includes digital logic, software, code, electronic instructions, flash memory, optical disks, CD-ROMs, DVD ROMs, magnetic or optical cards, other types of machine-readable mediums suitable for storing electronic instructions, or any suitable combination thereof. In operation, processors may store information in any suitable type of non-transitory storage medium (for example, random access memory (RAM), read only memory (ROM), field programmable gate array (FPGA), erasable programmable read only memory (EPROM), electrically erasable programmable ROM (EEPROM), etc.), software, hardware, or in any other suitable component, device, element, or object where appropriate and based on particular needs. Further, the information being tracked, sent, received, or stored in a processor could be provided in any database, register, table, cache, queue, control list, or storage structure, based on particular needs and implementations, all of which could be referenced in any suitable timeframe. Any of the memory items discussed herein should be construed as being encompassed within the broad term 'memory.' Similarly, any of the potential processing elements, modules, and machines described herein should be construed as being encompassed within the broad term 'microprocessor' or 'processor.' Furthermore, in various embodiments, the processors, memories, network cards, buses, storage devices, related peripherals, and other hardware elements described herein may be realized by a processor, memory, and other related devices configured by software or firmware to emulate or virtualize the functions of those hardware elements.

Computer program logic implementing all or part of the functionality described herein is embodied in various forms, including, but in no way limited to, a source code form, a computer executable form, and various intermediate forms (for example, forms generated by an assembler, compiler, linker, or locator). In an example, source code includes a series of computer program instructions implemented in various programming languages, such as an object code, an assembly language, or a high-level language such as OpenCL, Fortran, C, C++, JAVA, or HTML for use with various operating systems or operating environments. The source code may define and use various data structures and communication messages. The source code may be in a computer executable form (e.g., via an interpreter), or the source code may be converted (e.g., via a translator, assembler, or compiler) into a computer executable form.

In the discussions of the embodiments above, the capacitors, buffers, graphics elements, interconnect boards, clocks, DDRs, camera sensors, dividers, inductors, resistors, amplifiers, switches, digital core, transistors, and/or other components can readily be replaced, substituted, or otherwise modified in order to accommodate particular circuitry needs. Moreover, it should be noted that the use of complementary electronic devices, hardware, non-transitory software, etc. offers an equally viable option for implementing the teachings of the present disclosure.

In one example embodiment, any number of electrical circuits of the FIGURES may be implemented on a board of an associated electronic device. The board can be a general circuit board that can hold various components of the internal electronic system of the electronic device and, further, provide connectors for other peripherals. More specifically, the board can provide the electrical connections by which the other components of the system can communicate electrically. Any suitable processors (inclusive of digital signal processors, microprocessors, supporting chipsets, etc.), memory elements, etc. can be suitably coupled to the board based on particular configuration needs, processing demands, computer designs, etc. Other components such as external storage, additional sensors, controllers for audio/video display, and peripheral devices may be attached to the board as plug-in cards, via cables, or integrated into the board itself. In another example embodiment, the electrical circuits of the FIGURES may be implemented as stand-alone modules (e.g., a device with associated components and circuitry configured to perform a specific application or function) or implemented as plug-in modules into application specific hardware of electronic devices.

Note that with the numerous examples provided herein, interaction may be described in terms of two, three, four, or more electrical components. However, this has been done for purposes of clarity and example only. It should be appreciated that the system can be consolidated in any suitable manner. Along similar design alternatives, any of the illustrated components, modules, and elements of the FIGURES may be combined in various possible configurations, all of which are clearly within the broad scope of this Specification. In certain cases, it may be easier to describe one or more of the functionalities of a given set of flows by only referencing a limited number of electrical elements. It should be appreciated that the electrical circuits of the FIGURES and its teachings are readily scalable and can accommodate a large number of components, as well as more complicated/sophisticated arrangements and configurations. Accordingly, the examples provided should not limit the scope or inhibit the broad teachings of the electrical circuits as potentially applied to a myriad of other architectures.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "steps for" are specifically used in the particular claims; and (b) does not intend, by any statement in the specification, to limit this disclosure in any way that is not otherwise reflected in the appended claims.

EXAMPLE IMPLEMENTATIONS

There is disclosed in an example 1, a security controller apparatus for providing messaging services on a data exchange layer (DXL), comprising: a network interface; a DXL services engine operable for providing an application programming interface (API) for connecting to a DXL enterprise service bus (ESB) via the network interface; and a domain security engine operable for: subscribing to a DXL security topic; detecting a security event via the DXL ESB; and publishing a DXL security message via the DXL ESB configured for acting on the security event.

There is disclosed in an example 2, the apparatus of example 1 wherein the domain security engine is further operable to operate as a security information and event manager (SIEM).

There is disclosed in an example 3, the apparatus of example 2, wherein the domain security engine is further operable to subscribe to a SIEM topic via the DXL ESB.

There is disclosed in an example 4, the apparatus of example 3, wherein the domain security engine is further operable to act as a SIEM topic producer via the DXL ESB.

There is disclosed in an example 5, the apparatus of example 1, wherein the domain security engine is further operable for: consolidating a plurality of DXL messages; building a context-sensitive security policy; and publishing the context-sensitive security policy via a DXL message.

There is disclosed in an example 6, the apparatus of example 5, wherein building a context-sensitive security policy comprises assigning a location-independent security policy to a DXL endpoint, and publishing the assignment via a DXL message.

There is disclosed in an example 7, the apparatus of example 5, wherein building a context-sensitive security policy comprises: determining a device type for a DXL endpoint; and reporting via a DXL message available network services for automatically attaching an intrusion prevention system policy to the device.

There is disclosed in an example 8, the apparatus of example 5, wherein building a context-sensitive security policy comprises assigning a DXL endpoint a location-sensitive security policy, wherein location is a basis for assigning the DXL endpoint a trust level, and reporting the assignment via a DXL message.

There is disclosed in an example 9, the apparatus of example 5, wherein building a context-sensitive security policy comprises assigning a criticality score to a DXL endpoint, and reporting the assignment via a DXL message.

There is disclosed in an example 10, the apparatus of any of examples 1-9, wherein the domain security engine is further operable for: detecting an intrusion attempt; and publishing characteristics of the intrusion attempt via a DXL message.

There is disclosed in an example 11, the apparatus of any of examples 1-9, wherein the domain security engine is further operable for providing application sandboxing, and reporting results of application sandboxing via a DXL message.

There is disclosed in an example 12, the apparatus of any of examples 1-9, wherein the domain security engine is further operable for: detecting malicious command and control traffic from a DXL endpoint; and providing a DXL push notification to the DXL endpoint configured to notify the DXL endpoint that it is infected.

There is disclosed in an example 13, the apparatus of any of examples 1-9, wherein the domain security engine is further operable for interoperating in real-time or near-real-time with a security information and event manager.

There is disclosed in an example 14, one or more computer-readable storage mediums having stored thereon executable instructions operable for providing a data exchange layer (DXL) domain security engine operable for: communicatively coupling to a DXL enterprise security bus (ESB); subscribing to a DXL security topic; detecting a security event via the DXL ESB; and publishing a DXL security message via the DXL ESB configured for acting on the security event.

There is disclosed in an example 15, the one or more computer-readable mediums of example 14, wherein the domain security engine is further operable for: consolidating a plurality of DXL messages; building a context-sensitive security policy; and publishing the context-sensitive security policy via a DXL message.

There is disclosed in an example 16, the one or more computer-readable mediums of example 15, wherein building a context-sensitive security policy comprises assigning a location-independent security policy to a DXL endpoint, and publishing the assignment via a DXL message.

There is disclosed in an example 17, the one or more computer-readable mediums of example 15, wherein building a context-sensitive security policy comprises: determining a device type for a DXL endpoint; and reporting via a DXL message available network services for automatically attaching an intrusion prevention system policy to the device.

There is disclosed in an example 18, the one or more computer-readable mediums of example 15, wherein building a context-sensitive security policy comprises assigning a DXL endpoint a location-sensitive security policy, wherein location is a basis for assigning the DXL endpoint a trust level, and reporting the assignment via a DXL message.

There is disclosed in an example 19, the one or more computer-readable mediums of example 15, wherein building a context-sensitive security policy comprises assigning a criticality score to a DXL endpoint, and reporting the assignment via a DXL message.

There is disclosed in an example 20, the one or more computer-readable mediums any of examples 14-19, wherein the domain security engine is further operable for:

detecting an intrusion attempt; and publishing characteristics of the intrusion attempt via a DXL message.

There is disclosed in an example of 21, the one or more computer-readable mediums of any of examples 14-19, wherein the domain security engine is further operable for providing application sandboxing, and reporting results of application sandboxing via a DXL message.

There is disclosed in an example of 22, the one or more computer-readable mediums of any of examples 14-19, wherein the domain security engine is further operable for: detecting malicious command and control traffic from a DXL endpoint; and providing a DXL push notification to the DXL endpoint configured to notify the DXL endpoint that it is infected.

There is disclosed in an example of 23, the one or more computer-readable mediums of any of examples 14-19, wherein the domain security engine is further operable for interoperating in real-time or near-real-time with a security information and event manager.

There is disclosed in an example 24, a computer-implemented method for providing domain security on a data exchange layer (DXL), comprising: communicatively coupling to a DXL enterprise security bus (ESB); subscribing to a DXL security topic; detecting a security event via the DXL ESB; and publishing a DXL security message via the DXL ESB configured for acting on the security event.

There is disclosed in an example 25, the method of example 24, further comprising: consolidating a plurality of DXL messages; building a context-sensitive security policy; and publishing the context-sensitive security policy via a DXL message.

There is disclosed in an example 26, a method comprising the performing the instructions disclosed in any of examples 14-23.

There is disclosed in example 27, an apparatus comprising means for performing the method of example 26.

There is disclosed in example 28, the apparatus of claim 27, wherein the apparatus comprises a processor and memory.

There is disclosed in example 29, the apparatus of claim 28, wherein the apparatus further comprises a computer-readable medium having stored thereon software instructions for performing the method of example 26.

What is claimed is:

1. A security controller apparatus for providing messaging services on a data exchange layer (DXL), comprising:
   a memory communicatively coupled to one or more processors;
   a network interface;
   a DXL services engine operable for providing an application programming interface (API) for connecting to a DXL enterprise service bus (ESB) via the network interface, wherein the DXL is configured to provide a context-aware producer-consumer framework on a service-oriented architecture; and
   a domain security engine operable for consuming security events via the DXL, and configured for:
      subscribing to a DXL security topic as a DXL consumer;
      consuming a security event related to the DXL security topic via the DXL ESB;
      as a DXL producer, publishing a DXL security message via the DXL ESB, wherein the DXL security message is configured to enable a DXL consumer to act on the security message;
      consolidating a plurality of DXL messages;
      building a context-sensitive security policy, comprising assigning a location-independent security policy to a DXL endpoint, and publishing the assignment via a DXL message;
      publishing the context-sensitive security policy via a DXL message; and
      providing security information and event management (SIEM) services according to the DXL security message, comprising pooling data from a plurality of dissimilar resources and normalizing the data for consumption via the DXL.

2. The apparatus of claim 1, wherein the domain security engine is further operable to subscribe to a SIEM topic via the DXL ESB.

3. The apparatus of claim 2, wherein the domain security engine is further operable to act as a SIEM topic producer via the DXL ESB.

4. The apparatus of claim 1, wherein building a context-sensitive security policy comprises:
   determining a device type for a DXL endpoint; and
   reporting via a DXL message available network services for automatically attaching an intrusion prevention system policy to the device.

5. The apparatus of claim 1, wherein building a context-sensitive security policy comprises assigning a DXL endpoint a location-sensitive security policy, wherein location is a basis for assigning the DXL endpoint a trust level, and reporting the assignment via a DXL message.

6. The apparatus of claim 1, wherein building a context-sensitive security policy comprises assigning a criticality score to a DXL endpoint, and reporting the assignment via a DXL message.

7. The apparatus of claim 1, wherein the domain security engine is further operable for:
   detecting an intrusion attempt; and
   publishing characteristics of the intrusion attempt via a DXL message.

8. The apparatus of claim 1, wherein the domain security engine is further operable for providing application sandboxing, and reporting results of application sandboxing via a DXL message.

9. The apparatus of claim 1, wherein the domain security engine is further operable for:
   detecting malicious command and control traffic from a DXL endpoint; and
   providing a DXL push notification to the DXL endpoint configured to notify the DXL endpoint that it is infected.

10. The apparatus of claim 1, wherein the domain security engine is further operable for interoperating in real-time or near-real-time with a security information and event manager (SIEM).

11. One or more non-transitory computer-readable storage mediums having stored thereon executable instructions operable for providing a data exchange layer (DXL) domain security engine operable for consuming security events via the DXL, and configured for:
   communicatively coupling to a DXL enterprise security bus (ESB), wherein the DXL is configured to provide a context-aware producer-consumer framework on a service-oriented architecture;
   subscribing to a DXL security topic as a DXL consumer;
   consuming a security event related to the DXL security topic via the DXL ESB;

as a DXL producer, publishing a DXL security message via the DXL ESB, wherein the DXL security message is configured to enable a DXL consumer to act on the security message;

consolidating a plurality of DXL messages;

building a context-sensitive security policy, comprising assigning a location-independent security policy to a DXL endpoint, and publishing the assignment via a DXL message;

publishing the context-sensitive security policy via a DXL message; and providing security information and event management (SIEM) services according to the DXL security message, comprising pooling data from a plurality of dissimilar resources and normalizing the data for consumption via the DXL.

12. The one or more non-transitory computer-readable mediums of claim 11, wherein building a context-sensitive security policy comprises:

determining a device type for a DXL endpoint; and reporting via a DXL message available network services for automatically attaching an intrusion prevention system policy to the device.

13. The one or more non-transitory computer-readable mediums of claim 11, wherein building a context-sensitive security policy comprises assigning a DXL endpoint a location-sensitive security policy, wherein location is a basis for assigning the DXL endpoint a trust level, and reporting the assignment via a DXL message.

14. The one or more non-transitory computer-readable mediums of claim 11, wherein building a context-sensitive security policy comprises assigning a criticality score to a DXL endpoint, and reporting the assignment via a DXL message.

15. The one or more non-transitory computer-readable mediums of claim 11, wherein the domain security engine is further operable for:

detecting an intrusion attempt; and publishing characteristics of the intrusion attempt via a DXL message.

16. The one or more non-transitory computer-readable mediums of claim 11, wherein the domain security engine is further operable for providing application sandboxing, and reporting results of application sandboxing via a DXL message.

17. The one or more non-transitory computer-readable mediums of claim 11, wherein the domain security engine is further operable for:

detecting malicious command and control traffic from a DXL endpoint; and providing a DXL push notification to the DXL endpoint configured to notify the DXL endpoint that it is infected.

18. The one or more non-transitory computer-readable mediums of claim 11, wherein the domain security engine is further operable for interoperating in real-time or near-real-time with a security information and event manager (SIEM).

19. A computer-implemented method for providing domain security on a data exchange layer (DXL), comprising:

communicatively coupling to a DXL enterprise security bus (ESB), wherein the DXL is configured to provide a context-aware producer-consumer framework on a service-oriented architecture;

subscribing to a DXL security topic as a DXL consumer;

consuming a security event related to the DXL security topic via the DXL ESB;

as a DXL producer, publishing a DXL security message via the DXL ESB, wherein the DXL security message is configured to enable a DXL consumer to act on the security message;

consolidating a plurality of DXL messages;

building a context-sensitive security policy, comprising assigning a location-independent security policy to a DXL endpoint, and publishing the assignment via a DXL message;

publishing the context-sensitive security policy via a DXL message; and providing security information and event management (SIEM) services according to the DXL security message, comprising pooling data from a plurality of dissimilar resources and normalizing the data for consumption via the DXL.

* * * * *